United States Patent
Park (10) Patent No.: US 11,527,930 B2
(45) Date of Patent: Dec. 13, 2022

(54) MOTOR FOR DRONE AND DRONE COMPRISING SAME

(71) Applicant: LG INNOTEK CO., LTD., Seoul (KR)

(72) Inventor: Young Dae Park, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 966 days.

(21) Appl. No.: 16/327,693

(22) PCT Filed: Aug. 22, 2017

(86) PCT No.: PCT/KR2017/009116
§ 371 (c)(1),
(2) Date: Feb. 22, 2019

(87) PCT Pub. No.: WO2018/038493
PCT Pub. Date: Mar. 1, 2018

(65) Prior Publication Data
US 2019/0181701 A1 Jun. 13, 2019

(30) Foreign Application Priority Data
Aug. 22, 2016 (KR) .................. 10-2016-0106291

(51) Int. Cl.
*H02K 1/20* (2006.01)
*B64C 39/02* (2006.01)
(Continued)

(52) U.S. Cl.
CPC .............. *H02K 1/20* (2013.01); *B64C 27/12* (2013.01); *B64C 27/32* (2013.01); *B64C 39/02* (2013.01);
(Continued)

(58) Field of Classification Search
CPC ........ H02K 1/146; H02K 1/20; H02K 1/2786; H02K 21/22; H02K 9/06; B64C 27/32;
(Continued)

(56) References Cited

U.S. PATENT DOCUMENTS 8,922,087 B1 * 12/2014 Rittenhouse ........... H02K 29/03
310/156.01
2013/0052061 A1 2/2013 Li et al.
2013/0127284 A1 5/2013 Hamann et al.

FOREIGN PATENT DOCUMENTS

CN 102684341 9/2012
CN 102684341 B * 3/2014
(Continued)

OTHER PUBLICATIONS

Chinese Office Action dated Apr. 16, 2020 issued in Application No. 201780051668.0.
(Continued)

*Primary Examiner* — Jeremy A Luks
(74) *Attorney, Agent, or Firm* — KED & Associates, LLP (57) ABSTRACT

Provided is a motor for a drone comprising: a rotary shaft; a stator including a hole in which the rotary shaft is disposed; a rotor disposed outside the stator; and a housing coupled to the stator, wherein the stator comprises a stator core and a coil wound around the stator core, wherein the stator core comprises an annular yoke coupled to the housing, teeth extending radially from the yoke, and a shoe disposed at one end of the teeth, wherein the teeth comprise protrusions projecting from the side surface thereof. As such, the present invention provides an advantageous effect of securing an air flow path for heat radiation to enhance a heat radiating effect while preventing water or foreign matter from flowing into the motor.

9 Claims, 12 Drawing Sheets

(51) Int. Cl.
- *H02K 21/22* (2006.01)
- *B64C 27/32* (2006.01)
- *H02K 1/14* (2006.01)
- *H02K 1/2786* (2022.01)
- *H02K 9/06* (2006.01)
- *B64C 27/12* (2006.01)
- *H02K 3/18* (2006.01)
- *B64D 35/02* (2006.01)
- *H02K 7/14* (2006.01)
- *H02K 5/10* (2006.01)
- *H02K 7/08* (2006.01)
- *H02K 3/52* (2006.01)

(52) U.S. Cl.
CPC ............ *B64C 39/024* (2013.01); *B64D 35/02* (2013.01); *H02K 1/146* (2013.01); *H02K 1/2786* (2013.01); *H02K 3/18* (2013.01); *H02K 7/14* (2013.01); *H02K 9/06* (2013.01); *H02K 21/22* (2013.01); *H02K 21/227* (2013.01); *B64C 2201/042* (2013.01); *B64C 2201/108* (2013.01); *H02K 3/522* (2013.01); *H02K 5/10* (2013.01); *H02K 7/085* (2013.01)

(58) Field of Classification Search
CPC ............ B64C 39/024; B64C 2201/042; B64C 2201/108
See application file for complete search history.

(56) References Cited

FOREIGN PATENT DOCUMENTS

| | | | | |
|---|---|---|---|---|
| CN | 105846600 | | 8/2016 | |
| CN | 105846600 A | * | 8/2016 | ........... H02K 1/2786 |
| JP | 08-205439 | | 8/1996 | |
| JP | 2008-271729 | | 11/2008 | |
| JP | 2011-130602 | | 6/2011 | |
| JP | 2013-046571 | | 3/2013 | |

OTHER PUBLICATIONS

International Search Report (with English Translation) and Written Opinion (with English Translation) dated Nov. 27, 2017 issued in Application No. PCT/KR2017/009116.

* cited by examiner

MOTOR FOR DRONE AND DRONE COMPRISING SAME

CROSS-REFERENCE TO RELATED PATENT APPLICATIONS

This application is a U.S. National Stage Application under 35 U.S.C. § 371 of PCT Application No. PCT/KR2017/009116, filed Aug. 22, 2017, which claims priority to Korean Patent Application No. 10-2016-0106291, filed Aug. 22, 2016, whose entire disclosures are hereby incorporated by reference.

TECHNICAL FIELD

An embodiment relates to a motor for a drone and a drone including the same.

BACKGROUND ART

A drone is an unmanned aerial vehicle which includes a drone body with a plurality of propellers mounted thereon and which flies. The drone body includes a motor which drives the propeller. A rotor of the motor rotates due to an electrical interaction between a stator and the rotor such that the motor drives the propeller.

To increase power of the motor, the rotor may be disposed outside the stator. In the motor having such configuration, heat generated therein is very high. Accordingly, it is necessary to embody a heat dissipation structure which communicates an inside and an outside of the motor. However, since the motor is exposed by the heat dissipation structure, a danger is present that water or foreign substances may invade into the motor depending on a flying environment.

Also, high heat is generated by the stator on which a coil is wound. Accordingly, when the heat dissipation structure is spaced apart from the stator, there is a problem that a heat dissipation effect is not large.

DISCLOSURE

Technical Problem

The present invention is directed to providing a motor for a drone, which is capable of increasing a heat dissipation effect while preventing water or foreign substances from invading into the motor, and a drone including the motor.

Aspects of the embodiment are not limited to the above-stated aspect and other unstated aspects can be clearly understood by those skilled in the art from the following description.

Technical Solution

One aspect of the present invention provides a motor for a drone, the motor including a rotating shaft, a stator including a hole in which the rotating shaft is disposed, a rotor disposed outside the stator, and a housing combined with the stator. Here, the stator includes a stator core and a coil wound on the stator core. The stator core includes an annular yoke combined with the housing, teeth extending from the yoke in a radial direction, and a shoe disposed on one end of each of the teeth. Also, the teeth include protrusions protruding from side surfaces.

The protrusions may be disposed between the yoke and the shoe.

The coil may be disposed outside the protrusions in a radial direction of the stator.

The teeth may include a first tooth and a second tooth which are adjacent to each other. Here, the first tooth may include a first side surface. The second tooth may include a second side surface disposed to face the first side surface. Also, the protrusions may include a first protrusion protruding from the first side surface and a second protrusion protruding from the second side surface.

The first protrusions and the second protrusions may be arranged from a top end to a bottom end of the stator along a height direction of the stator.

The stator may include a flow path disposed inside the protrusions. Here, the flow path may be surrounded by the first side surface, the second side surface, an outer circumferential surface of the yoke between the first tooth and the second tooth, an inner surface of the first protrusion, and an inner surface of the second protrusion.

The first protrusion and the second protrusion may be arranged while being spaced apart from each other.

The first protrusion and the second protrusion may be symmetrically arranged on the basis of a reference line which passes the first tooth, a middle point between the teeth, and a center of the stator.

The rotor may include a cover portion which is combined with the rotating shaft and covers a top of the stator, a body portion which covers a side part of the stator, and a magnet combined with an inner circumferential surface of the body portion. Here, the housing may include a column portion combined with the yoke and a bottom portion which extends from the column portion and covers a bottom of the stator.

The cover portion may include a stepped portion protruding from a bottom surface, and the stepped portion may be disposed between the protrusion and the column portion in the radial direction of the stator.

A top end of the column portion may be disposed to be higher than a top end of the yoke in a height direction of the stator.

A bottom end of the stepped portion may be disposed between the top end of the column portion and the top end of the yoke in the height direction of the stator.

The cover portion may include a top surface including a plurality of first through holes.

The cover portion may include a plurality of blades protruding from the top surface.

A bottom portion of the housing may include a plurality of second through holes.

Another aspect of the present invention provides a drone including a drone body, a motor combined with the drone body, and a propeller combined with the motor. Here, the motor includes a rotating shaft, a stator including a hole in which the rotating shaft is disposed, a rotor disposed outside the stator, and a housing combined with the stator. The stator includes a stator core and a coil wound on the stator core. The stator core includes an annular yoke combined with the housing, teeth extending from the yoke in a radial direction, and a shoe disposed on one end of each of the teeth. Also, the teeth include protrusions protruding from side surfaces.

In the drone, the protrusions may be disposed between the yoke and the shoe.

In the drone, the coil may be disposed outside the protrusions in a radial direction of the stator.

In the drone, the rotor may include a cover portion which is combined with the rotating shaft and covers a top of the stator, a body portion which covers a side part of the stator, and a magnet combined with an inner circumferential surface of the body portion. Here, the housing may include a column portion combined with the yoke and a bottom portion which extends from the column portion and covers a bottom of the stator.

In the drone, the cover portion may include a stepped portion protruding from a bottom surface, and the stepped portion may be disposed between the protrusion and the column portion in the radial direction of the stator.

In the drone, a bottom end of the stepped portion may be disposed between a top end of the column portion and a top end of the yoke in the height direction of the stator.

Advantageous Effects

According to an embodiment, an advantageous effect of increasing a heat dissipation effect by securing a flow path for air for dissipating heat while preventing water or foreign substances from flowing into a motor is provided using a component which covers a top of a stator.

According to an embodiment, an advantageous effect of further increasing a heat dissipation effect is provided by forming a flow path, through which air passes, to be adjacent to teeth which generate a lot of heat.

According to an embodiment, advantageous effects of simplifying manufacturing processes and reducing manufacturing costs are provided by forming a flow path, through which air passes from a bottom to a top of a motor, using only a simple structure, in which protrusions are arranged on teeth of a stator, without installation of an additional component.

According to an embodiment, an advantageous effect of preventing water, which is flowing into a motor, from flowing into a bearing is provided by disposing a step portion protruding from a cover portion covering a stator to surround a column portion.

According to an embodiment, since it is unnecessary to additionally install an additional component for preventing water from flowing into a bearing, advantageous effects of simplifying manufacturing processes and reducing manufacturing costs are provided.

According to embodiments, since it is possible to discharge not only air but also water, which is flowing into a motor, through a flow path formed between a yoke and protrusions of teeth, an advantageous effect of preventing the water, which is flowing into the motor, from flowing into a bearing is provided.

MODES OF THE INVENTION

Hereinafter, an exemplary embodiment of the present invention will be described in detail with reference to the attached drawings. The purpose, particular advantages, and novel features of the present invention will be more clearly understood from the following detailed description and exemplary embodiments which are related to the attached drawings. Also, a detailed description on well-known related art that may unnecessarily obscure the essentials of the present invention will be omitted.

Figure 1:
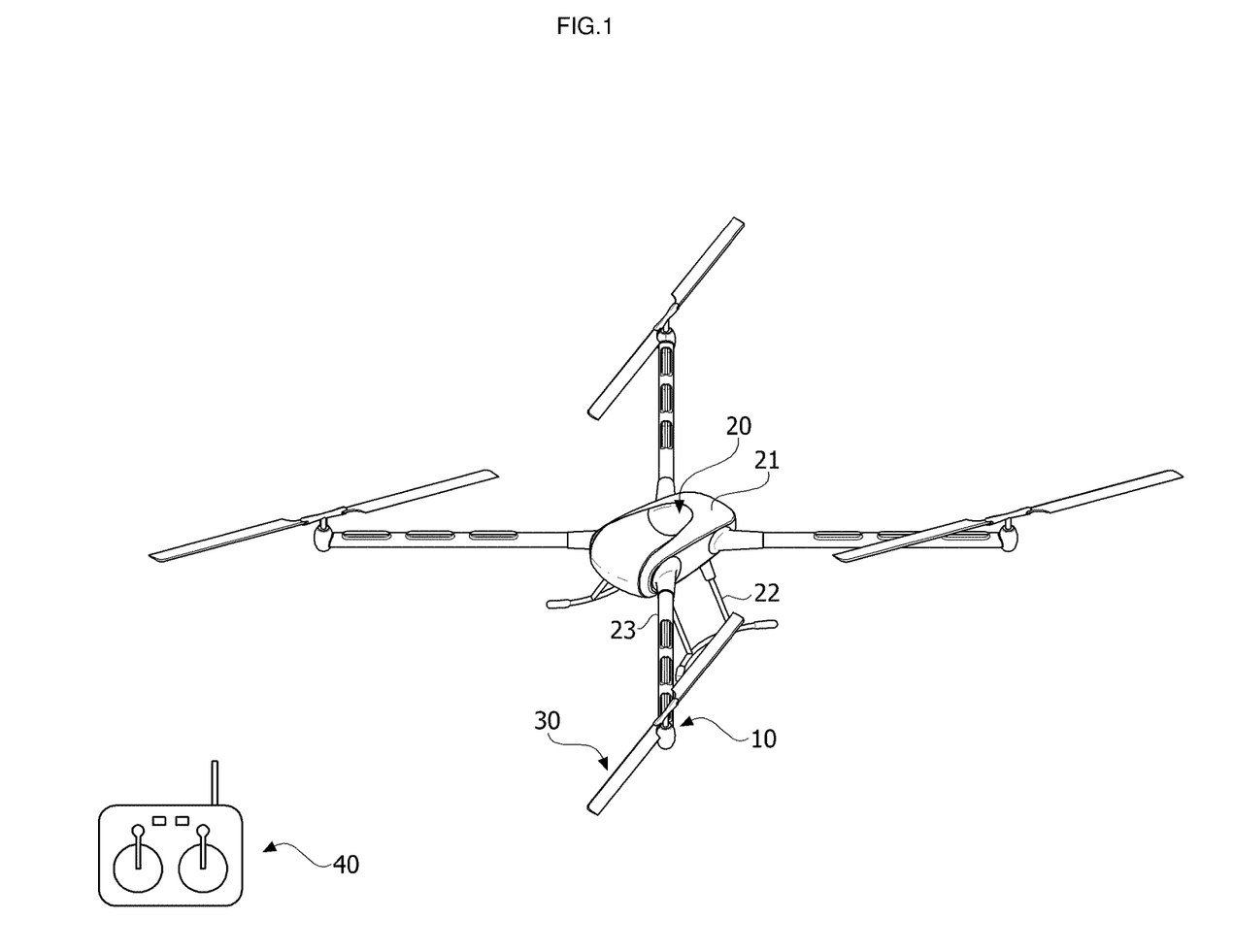
FIG. 1 is a view of a drone according to an embodiment.
Figure 2:
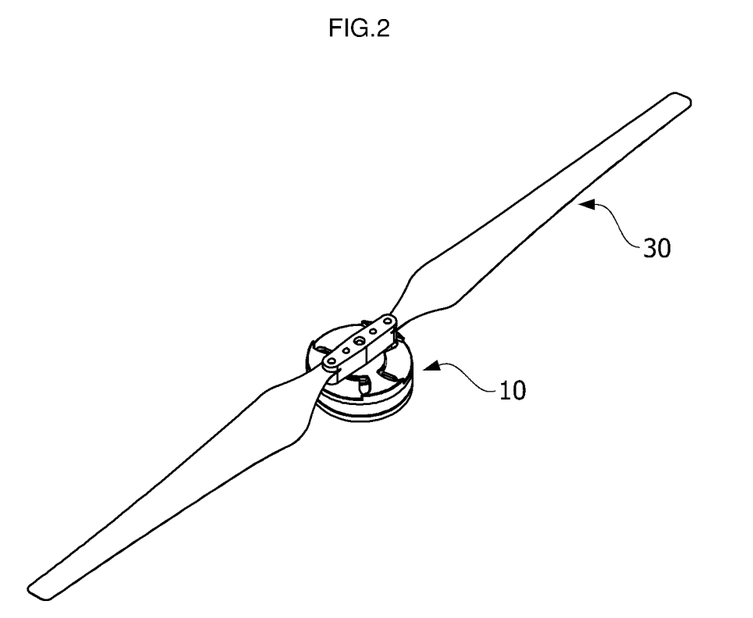
FIG. 2 is a view illustrating a motor and a propeller.

FIG. 1 is a view illustrating a drone according to an embodiment, and FIG. 2 is a view illustrating a motor and a propeller.

Referring to FIGS. 1 and 2, the drone according to the embodiment may include a motor 10, a drone body 20, a propeller 30, and a controller 40. Here, the drone body 20 may include a main body 21, landing means 22, and a propeller support portion 23.

The drone body 20 forms an exterior of the drone. The drone body 20 includes a plurality of such propeller support portions 23. The plurality of propeller support portions 23 are radially formed on the main body 21. The motor 10 may be mounted on each of the propeller support portions 23. The propeller 30 is mounted on each of such motors 10. Also, a wireless type controller 40, which controls driving of the motors 10, may be included.

Figure 3:
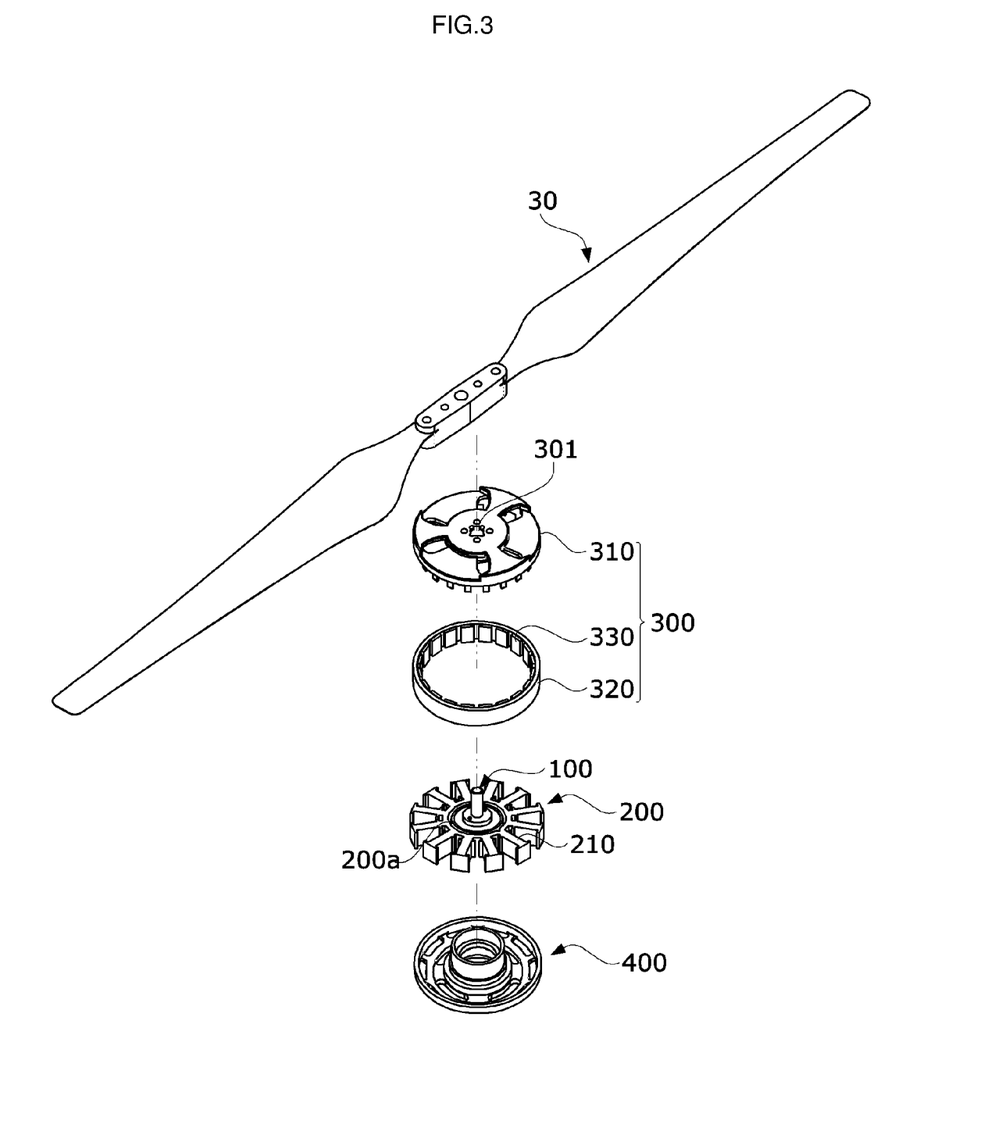
FIG. 3 is an exploded view of the motor.

FIG. 3 is an exploded view of the motor.

Referring to FIG. 3, the motor 10 may include a rotating shaft 100, a stator 200, a rotor 300, and a housing 400.

The rotating shaft 100 is disposed to pass through a center of the stator 200. The rotating shaft 100 may be rotatably combined with a hole 200a of a stator core 201. The rotating shaft 100 is connected to the propeller 30 and a cover portion 310 and transfers a driving force of the motor 10 to the propeller 30.

The stator 200 causes an electrical interaction with the rotor 300 and induces the rotor 300 to rotate.

The rotor 300 is disposed outside the stator 200. The rotor 300 may include the cover portion 310, a body portion 320, and a magnet 330.

The cover portion 310 covers a top of the stator 200. The body portion 320 covers a side of the stator 200. The cover portion 310 and the body portion 320 may be formed to surround the stator 200 overall. These are components for preventing water or foreign substances from flowing into the motor 10. A hole 301, through which the rotating shaft 100 passes, may be formed at a center of the cover portion 310.

The body portion 320 surrounds a side part of the stator 100. The body portion 320 is formed to have a hollow tubular shape The body portion 320 is disposed such that an inner circumferential surface thereof faces teeth of the stator core 201. The magnets 330 may be attached to the inner circumferential surface of the body portion 320. The body portion 320 corresponds to a yoke which forms a magnetic path of the magnet 330.

A top end of the body portion 320 may be combined with a top surface portion 312 of the cover portion 310. The body portion 320 and the cover portion 310 may be manufactured as an integral form by doubly injection-molding separate materials or may be manufactured as a single product. A bottom end of the body portion 320 may be combined with the housing 400.

The magnet 330 is combined with the inner circumferential surface of the body portion 320. The magnet 330 causes an electrical interaction with the coil wound on the stator core 201.

Meanwhile, the stator 200 is located in an internal space formed by the cover portion 310, the body portion 320, and the housing 400.

Figure 4:
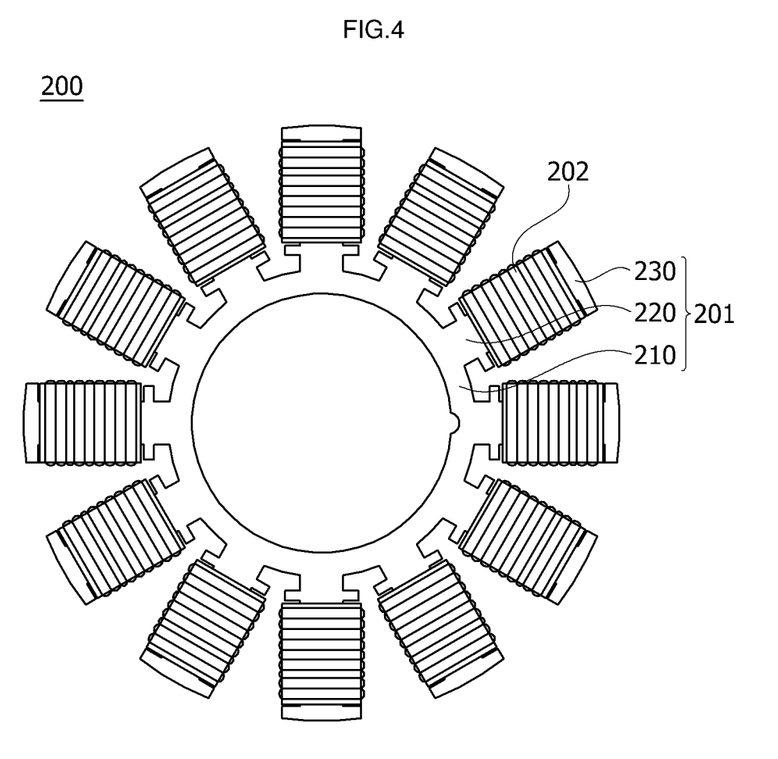
FIG. 4 is a view illustrating a stator.

FIG. 4 is a view illustrating the stator.

Referring to FIG. 4, the stator 200 may include the stator core 201 and a coil 202.

The stator core 201 may be formed by stacking a plurality of plates having a thin steel plate shape. Otherwise, the stator core 201 may be configured as a single product formed of a cylinder. Also, the stator core 201 may be formed by mutually combining or connecting a plurality of divided cores. Each of the divided cores may also be formed by stacking a plurality of plates having a thin plate shape or formed as a single produced formed of a cylinder.

The stator core 201 may include a yoke 210, a tooth 220, and a shoe 230. The yoke 210 has an annular shape. The hole 200a is disposed in a center of the yoke 210. A column portion 410 of the housing 400 is inserted into the hole 200a. The tooth 220 protrudes from an outer circumferential surface of the yoke 210 in a radial direction. A plurality of such teeth 220 are arranged. The plurality of teeth 220 are arranged along a circumference of the yoke 210. The coil 202 is wound on the tooth 220. The shoe 230 is disposed on an end of the tooth 220. The shoe 230 has a shape extending from both side surfaces of the tooth 220 in a circumferential direction. A winding space of the coil 202 is formed inside the shoe 230.

Figure 5:
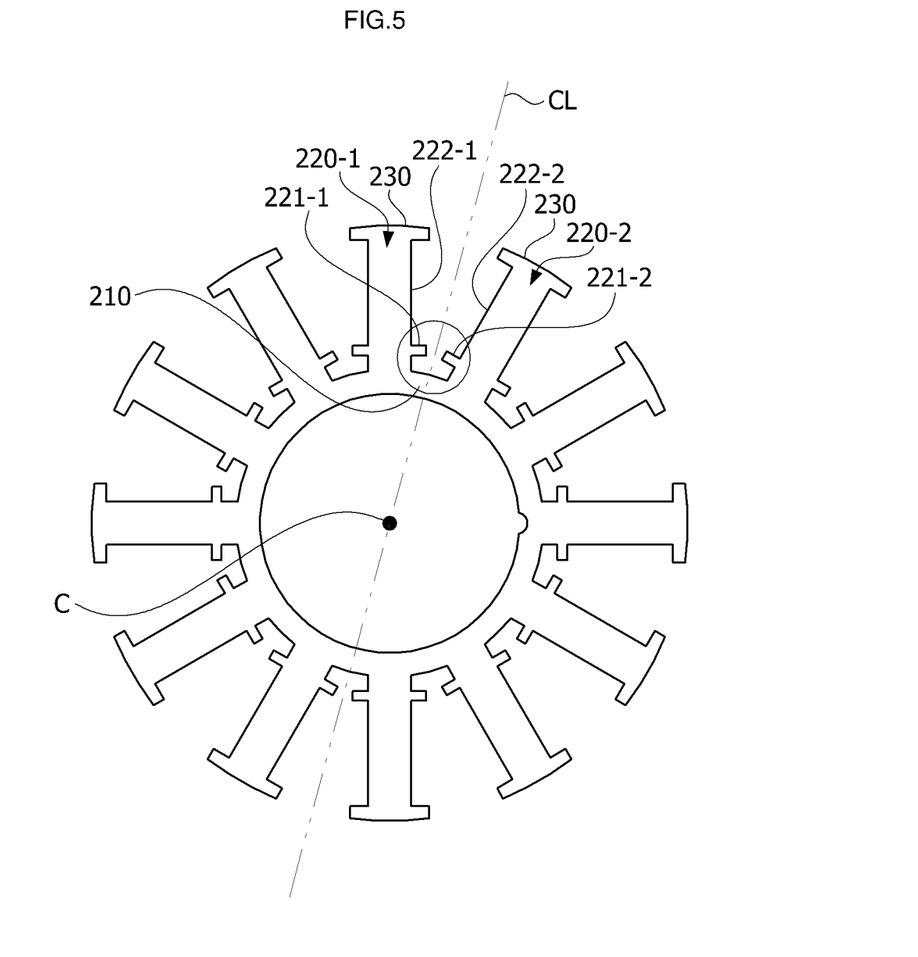
FIG. 5 is a view illustrating a stator core shown in FIG. 4.
Figure 6:
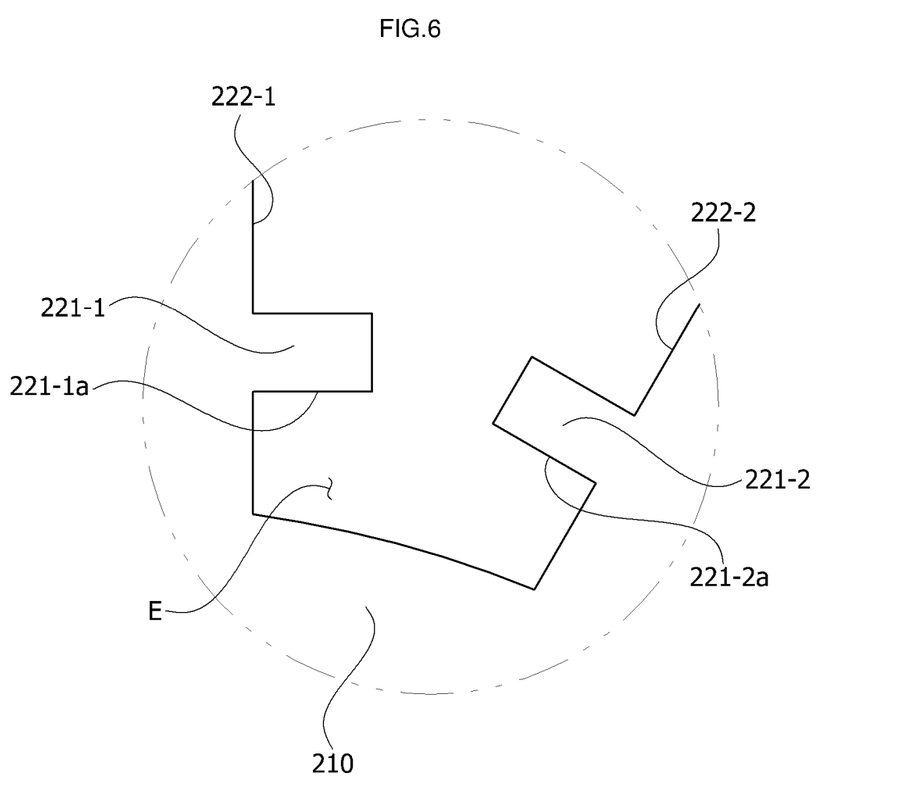
FIG. 6 is a view illustrating a protrusion which forms a flow path.

FIG. 5 is a view illustrating the stator core shown in FIG. 4, and FIG. 6 is a view illustrating protrusions which form a flow path.

Referring to FIGS. 5 and 6, the stator core 201 includes a protrusion 221. In detail, such protrusions 221 are arranged on both sides of the tooth 220. The protrusions 221 form a flow path E. The flow path E may be disposed while passing through a bottom to a top of the stator core 201. Air, which flows from the outside of the motor, passes through the flow path E. The air passing through the flow path E absorbs and discharges heat generated by the coil 202 or the stator core 201 to the outside. Since the flow path E is located in a center of the stator core 201 in which a great deal of heat is generated, a heat dissipation effect is very high.

The protrusion 221 will be described in detail as follows.

Among the plurality of teeth 220, adjacent teeth will be referred to as a first tooth 220-1 and a second tooth 220-2. The first tooth 220-1 includes a first side surface 222-1. The second tooth 220-2 includes a second side surface 222-2. Here, the first tooth 220-1 and the second tooth 220-2 are symmetrically arranged on the basis of a reference line CL. Here, the reference line CL means a virtual straight line which passes a middle point between the first tooth 220-1 and the second tooth 220-2 and a center C of the stator core 201 along a circumferential direction.

The first side surface 222-1 and the second side surface 222-2 are arranged to face each other. The protrusion 221 protrudes from each of the first side surface 222-1 and the second side surface 222-2. A protrusion protruding from the first side surface 222-1 is referred to as the first protrusion 221-1. A protrusion protruding from the second side surface 222-2 is referred to as the second protrusion 221-2. The first protrusion 221-1 and the second protrusion 221-2 may be arranged to be spaced apart from each other. The first protrusion 221-1 and the second protrusion 221-2 may be arranged to be symmetrical to each other on the basis of the reference line CL.

The protrusion 221 may be disposed between the shoe 230 and the yoke 210 on the basis of a radial direction. Also, the coil 202 may be disposed outside the protrusion 221.

Here, the protrusion 221 may be disposed to be more adjacent to the yoke 210 than the shoe 230. This is to secure the winding space when it is considered that the coil 202 is disposed outside the protrusion 221. The first protrusion 221-1 and the second protrusion 221-2 may be arranged from a top end to a bottom end of the stator 200 along a height direction of the stator 200. Although the first protrusion 221-1 and the second protrusion 221-2 are shown as having a quadrangular cross section in the drawing, the present invention is not limited thereto and they may be modified into a variety of shapes including a polygonal or a curved shape.

The flow path E is a space surrounded by an inner surface 221-1a of the first protrusion 221-1, an inner surface 221-2a of the second protrusion 221-2, the first side surface 222-1, the second side surface 222-2, and an outer circumferential surface of the yoke 210. An inside of the flow path E is located to be adjacent to the yoke 210, and an outside thereof is located to be adjacent to the coil 202. Accordingly, the motor according to the embodiment has a structure capable of cooling heat in the center of the stator core 201 where a greatest amount of heat is generated. Air flowing from above the stator 200 or air flowing from below the stator 200 takes away heat generated at the center of the stator 201 and releases the heat to the outside of the motor.

Figure 7:
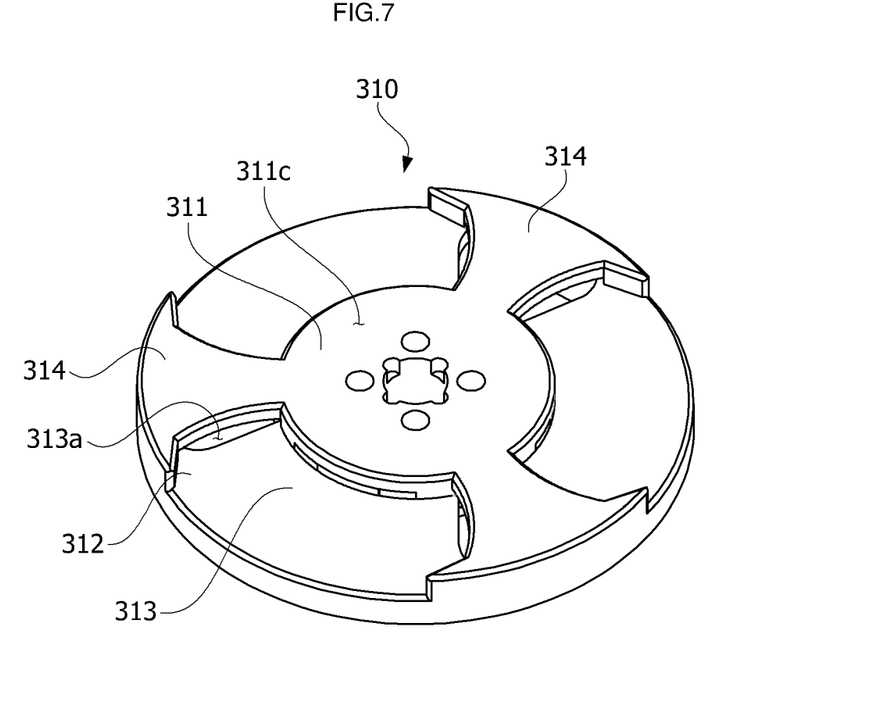
FIG. 7 is a view illustrating a cover portion.

FIG. 7 is a view illustrating the cover portion.

The cover portion 310 may include a propeller combination portion 311, the top surface portion 312, a connection portion 313, and a blade 314. The top surface portion 312 is connected to the body portion 320 (refer to FIG. 3). Also, the connection portion 313 connects the top surface portion 312 to the propeller combination portion 311. A plurality of such connection portions 313 may be provided, and a first through hole 313a may be disposed between the connection portions 313. The blade 314 may be disposed above the first through hole 313a. A top surface 311c of the propeller combination portion 311 may be formed to be higher than the top surface portion 312.

Figure 8:
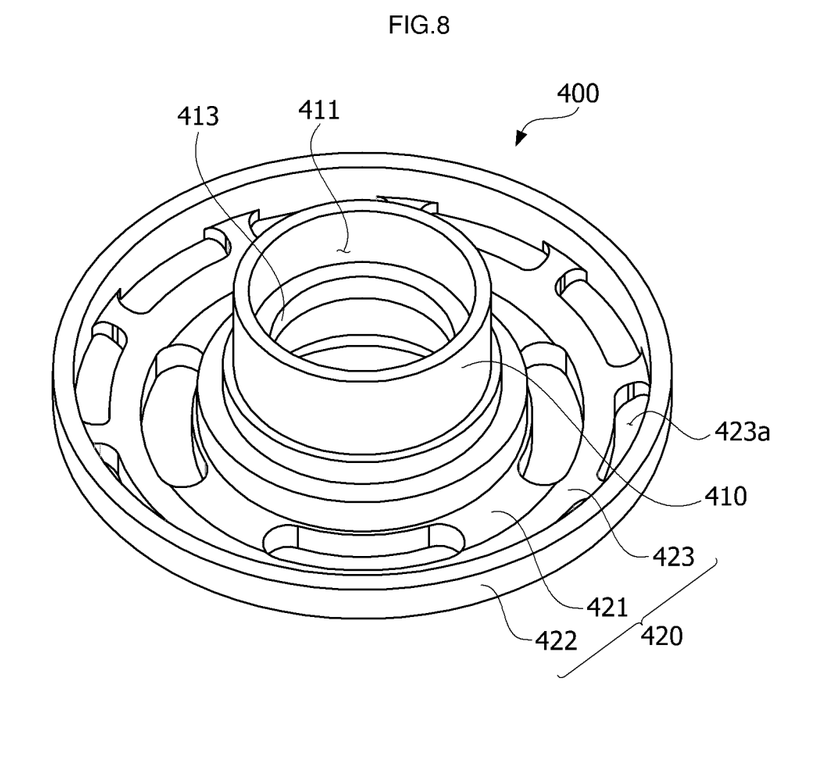
FIG. 8 is a view illustrating a housing.
Figure 9:
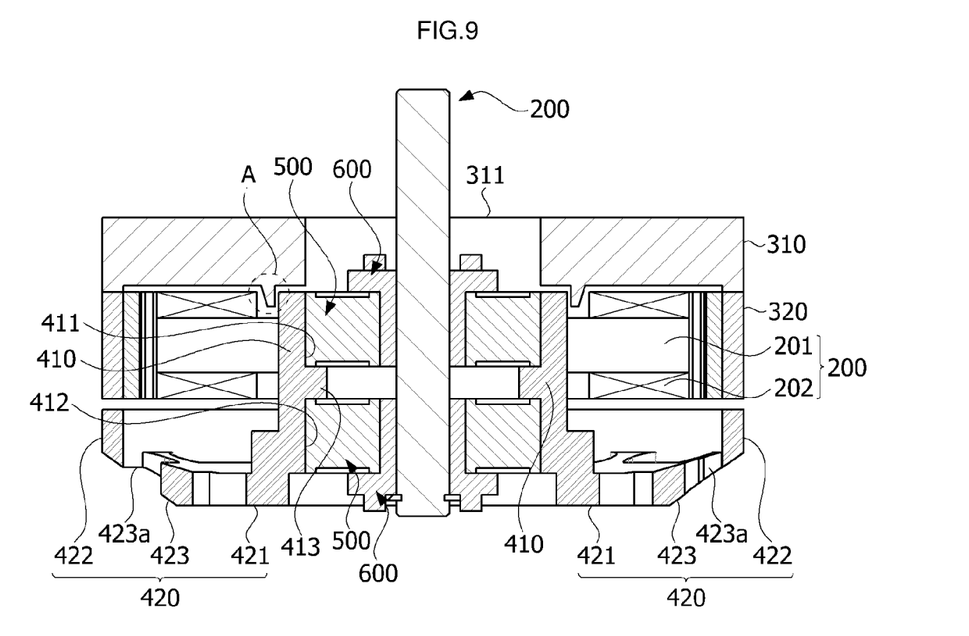
FIG. 9 is a cross-sectional view of a motor for a drone.

FIG. 8 is a view illustrating the housing, and FIG. 9 is a cross-sectional view of the motor for a drone.

Referring to FIGS. 8 to 9, the housing 400 may include the column portion 410 and a bottom portion 420.

The column portion 410 forms a central hole thereinside. Also, the stator core 201 may be combined with an outside of the column portion 410. A pocket portion 411 may be provided inside the column portion 410. The column portion 411 may be provided at each of a top and a bottom of the column portion 410. The pocket portion 411 may include a first pocket 411 and the second pocket 412. A rib 413 may protrude from an inner circumferential surface of the column portion 410. The first pocket 411 may be provided above the rib 413, and the second pocket 412 may be provided below the rib 413 on the basis of the protruding rib 413. A bearing 500 may be mounted on each of the first pocket 411 and the second pocket 412. The rotating shaft 100 may be inserted into the bearing 500. Here, a holder 600 may be inserted between the bearing 500 and the rotating shaft 100. The holder 600 located above may be connected to the connection portion 311.

The bottom portion 420 extends from a bottom end of the column portion 410 in a radial direction and covers a bottom of the stator 200. The bottom portion 420 may include a bottom part 421, a sidewall part 422, and a connection part 423. The bottom part 421, the sidewall part 422, and the connection part 423 may be described while being classified according to shapes and functional features thereof but are vertically connected to one another as one means.

The bottom part 421 extends from a bottom end of the column portion 410. The sidewall part 422 is disposed while being spaced apart from the bottom part 421. The connection part 423 connects the bottom part 421 to the sidewall part 422. Here, the connection part 423 may be formed to be inclined. Also, the connection part 423 may include a second through hole 423a. A plurality of such second through holes 423a may be provided. Each of the second through holes 423a of the housing 400 may be aligned with the first through hole 313a of the cover portion 310 along the circumferential direction. When the motor 10 for a drone rotates, outside air may be suctioned in the motor 10 for a drone through the second through holes 423a. Otherwise, on the other hand, depending on a direction of the blade 314 and a rotation direction of the motor 10 for a drone, inside air of the motor 10 for a drone may be discharged outward through the second through holes 423a.

Figure 10:
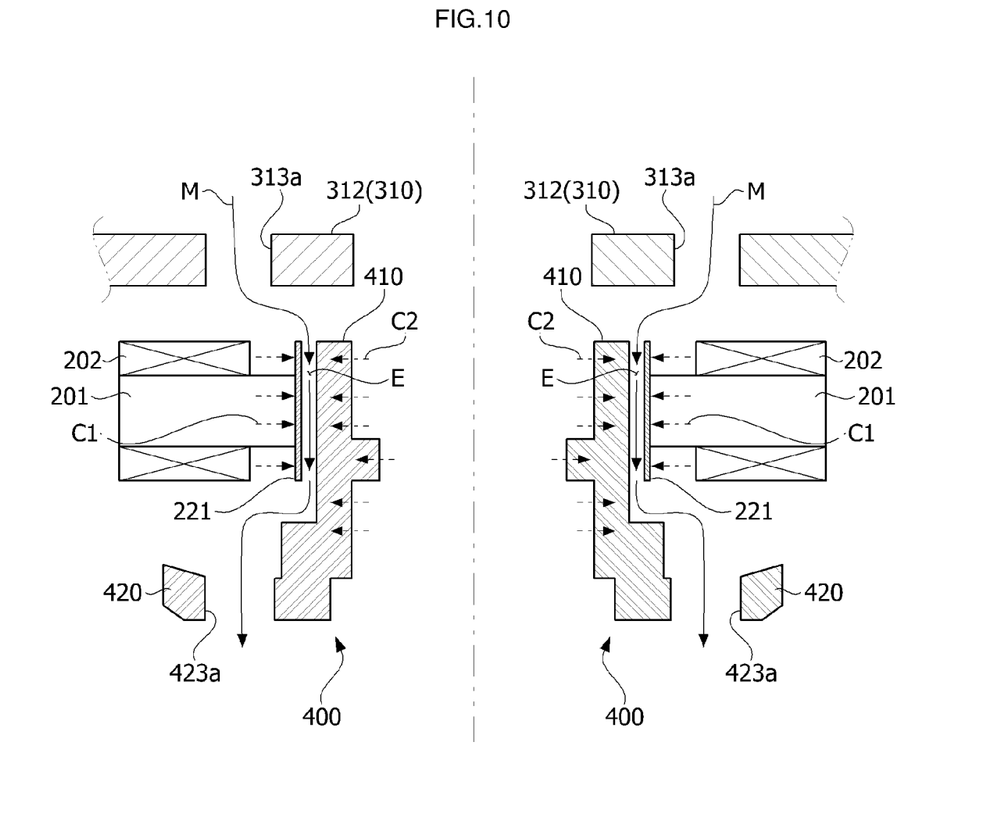
FIG. 10 is a view illustrating a flow of air which passes through a flow path.

FIG. 10 is a view illustrating a flow of air which passes through the flow path.

Referring to FIG. 10, when the motor rotates, outside air M flows into the motor through the first through hole 313a. The air flowing through the first through hole 313a passes through the flow path E. During a process in which the air M passes through the flow path E, the air M absorbs heat generated by the coil 202 as C1 shown in FIG. 10 or heat generated inside the column portion 410 as C2 shown in FIG. 10 so as to cool the center of the stator core 201. The air M passing through the flow path E is discharged outward from the motor through the second through holes 423a.

Although it is shown that the outside air M flows into the motor through the first through hole 313a when the motor rotates in FIG. 10, the present invention is not limited thereto and may be changed such that the outside air M flows into the motor through the second through holes 423a, cools the center of the stator core 201, and then is discharged through the first through hole 313a when the motor rotates.

Figure 11:
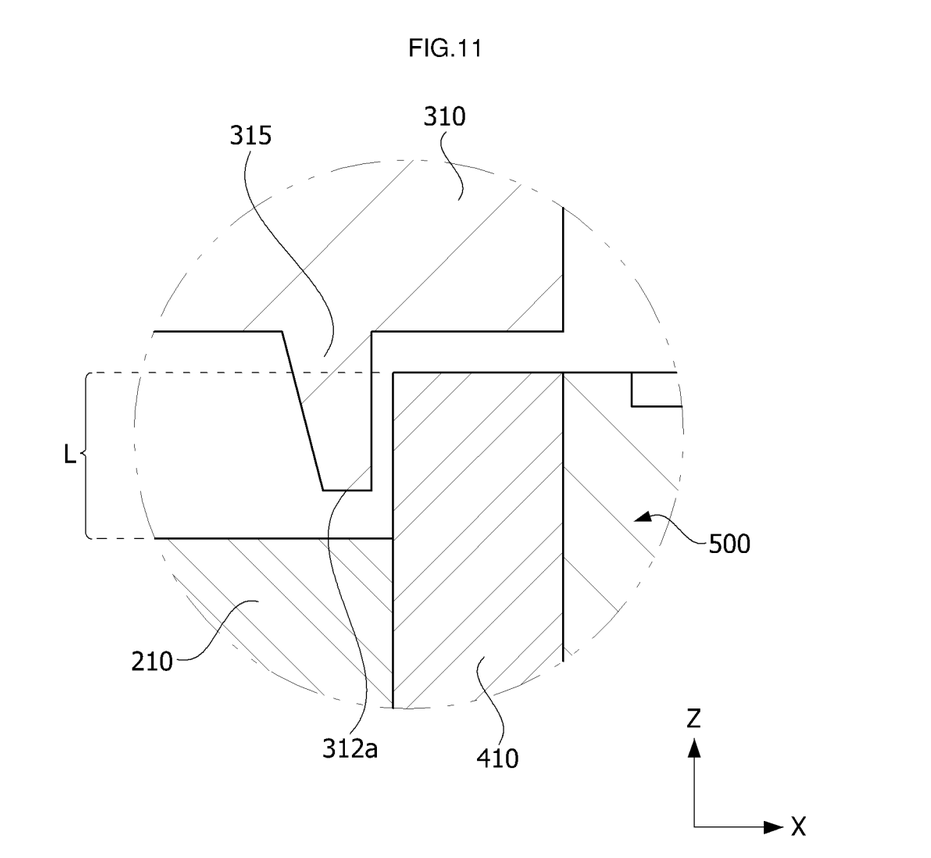
FIG. 11 is an enlarged view of A in FIG. 9 that illustrates a step portion of the cover portion.

FIG. 11 is an enlarged view of A in FIG. 9 that illustrates a step portion of the cover portion.

Referring to FIGS. 9 and 11, the cover portion 310 may include a stepped portion 315. The stepped portion 315 protrudes from a bottom surface of the cover portion 310. Also, the stepped portion 315 may be disposed to surround the column portion 410 of the housing 400. Also, the stepped portion 315 may be disposed between the protrusion 221 and the column portion 410 on the basis of a radial direction of the stator 200. The stepped portion 315 may be disposed outside the column portion 410 while being spaced apart therefrom. Meanwhile, a top end of the column portion 410 may be disposed to be higher than a top end of the yoke 210. As a result thereof, on the basis of the height direction of the stator 200 (z-axis direction in FIG. 11), a stepped space may occur as L shown in FIG. 11. The stepped portion 315 may be disposed such that a bottom end 312a thereof is located in the stepped space L. In other words, the bottom end 312a of the stepped portion 315 may be disposed between the top end of the column portion 410 and the top end of the yoke 210.

The stepped portion 315 prevents water flowing into the motor from flowing into the bearing 500. The water prevented from flowing into the bearing 500 through the stepped portion 315 may be discharged outward from the motor through the flow path E.

Figure 12:
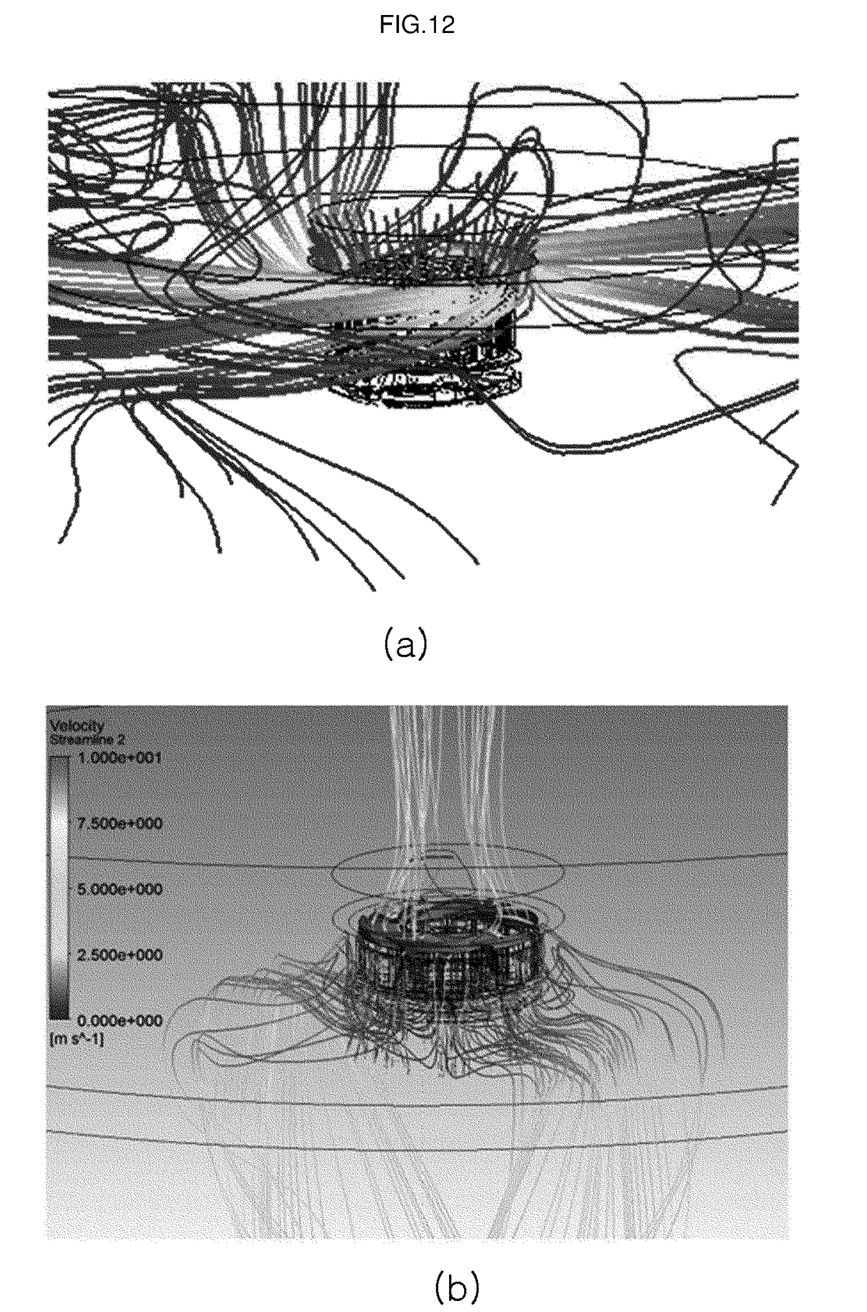
FIG. 12 is a view in which performance of a motor without protrusions is compared with performance of the motor including protrusions according to the embodiment.

FIG. 12 is a view in which performance of a motor without protrusions is compared with performance of the motor including protrusions according to the embodiment.

Referring to FIG. 12, as seen from FIG. 12(a), in the case of the motor without protrusions, a flow is generally formed above the motor, and a heat dissipation effect inside the motor according to an air flow is not large. As a result of experiment, flux of air passing through a top to a bottom of the motor is 0.0001 kg/s, which is very small.

On the other hand, as seen from FIG. 12(b), in the case of the motor with the protrusions 221 (refer to FIG. 5), a flow is embodied from a top to a bottom of the motor such that a heat dissipation effect inside the motor according to an air flow is large. As a result of experiment, it may be seen that flux of air passing through the top to bottom of the motor is 0.0016 kg/s, which is more than ten times as great as that of the case of FIG. 12(a).

As described above, the motor for a drone and the drone including the same according to one exemplary embodiment of the present invention have been described in detail with reference to the attached drawings.

The above description is merely for exemplarily describing the technical concept of the present invention, and a variety of modifications, changes, and replacements thereof may be made by one of ordinary skill in the art to which the present invention pertains without departing from the essential features of the present invention. Accordingly, the embodiments disclosed herein and the attached drawings are not intended to limit and merely explain the technical concept of the present invention, and the scope of the present invention should not be limited by the above embodiment and the attached drawings. The scope of the present invention should be interpreted by the following claims and all technical concepts within the equivalent scope thereof should be interpreted as being included in the scope of the present invention.

DESCRIPTION OF REFERENCE NUMERALS

10: motor, 20: drone body, 30: propeller, 40: controller, 100: rotating shaft, 200: stator, 200a: hole, 201: stator core, 210: yoke, 220: tooth, 221: protrusion, 230: shoe, 202: coil, 300: rotor, 310: cover portion, 311: propeller combination portion, 312: top surface portion, 313: connection portion, 313a: first through hole, 314: blade, 315: stepped portion, 320: body portion, 330: magnet, 400: housing, 410: column portion, 420: bottom portion, 423a: second through hole

The invention claimed is:

1. A motor for a drone, the motor comprising:
a rotating shaft;
a stator comprising a hole in which the rotating shaft is disposed;
a rotor disposed outside the stator; and
a housing combined with the stator,
wherein the stator comprises a stator core and a coil wound on the stator core,
wherein the stator core comprises an annular yoke combined with the housing, teeth extending from the yoke in a radial direction, and a shoe disposed on one end of each of the teeth, and
wherein the teeth comprise protrusions protruding from side surfaces,
wherein the protrusions is disposed between the shoe and the yoke on the basis of a radial direction,
wherein the coil is disposed between the protrusions and the shoe on the basis of a radial direction, and
a flow path is disposed between the protrusions and the yoke on the basis of a radial direction,
wherein the teeth comprises a first tooth and a second tooth which are adjacent to each other,
wherein the first tooth comprises a first side surface, wherein the second tooth comprises a second side surface disposed to face the first side surface, and wherein the protrusions comprise a first protrusion that protrudes from the first side surface of the first tooth to a first protrusion end, and a second protrusion that protrudes from the second side surface of the second tooth to a second protrusion end, wherein the flow path is disposed between the first protrusion end and the second protrusion end.

2. The motor of claim 1, wherein the rotor comprises:
a cover portion which is combined with the rotating shaft and covers a top of the stator;
a body portion which covers a side part of the stator; and
a magnet combined with an inner circumferential surface of the body portion,
wherein the housing comprises a column portion combined with the yoke and a bottom portion which extends from the column portion and covers a bottom of the stator.

3. The motor of claim 1, wherein the flow path is surrounded by the first side surface, the second side surface, an outer circumferential surface of the yoke between the first tooth and the second tooth, an inner surface of the first protrusion, and an inner surface of the second protrusion.

4. The motor of claim 1, wherein the first protrusion and the second protrusion are symmetrically arranged on the basis of a reference line which passes the first tooth, a middle point between the teeth, and a center of the stator.

5. The motor of claim 2, wherein the cover portion comprises a propeller combination portion, a top surface portion connected to the body portion, a plurality of connection portions connecting the top surface portion to the propeller combination portion, and a first through hole disposed between two of the connection portions and that communicates with the flow path.

6. The motor of claim 2, wherein the cover portion comprises a stepped portion protruding from a bottom surface, and
wherein the stepped portion is disposed between the protrusion and the column portion in a radial direction of the stator.

7. The motor of claim 6, wherein a top end of the column portion is disposed to be higher than a top end of the yoke in a height direction of the stator.

8. The motor of claim 6, wherein a bottom end of the stepped portion is disposed between a top end of the column portion and a top end of the yoke in a height direction of the stator.

9. A drone comprising:
a drone body;
a motor combined with the drone body; and
a propeller combined with the motor,
wherein the motor comprises:
a rotating shaft;
a stator comprising a hole in which the rotating shaft is disposed;
a rotor disposed outside the stator; and
a housing combined with the stator,
wherein the stator comprises a stator core and a coil wound on the stator core,
wherein the stator core comprises an annular yoke combined with the housing, teeth extending from the yoke in a radial direction, and a shoe disposed on one end of each of the teeth,
wherein the teeth comprise protrusions protruding from side surfaces,
wherein the protrusions is disposed between the shoe and the yoke on the basis of a radial direction,
wherein the coil is disposed between the protrusions and the shoe on the basis of a radial direction, and
a flow path is disposed between the protrusions and the yoke on the basis of a radial direction,
wherein the teeth comprises a first tooth and a second tooth which are adjacent to each other,
wherein the first tooth comprises a first side surface,
wherein the second tooth comprises a second side surface disposed to face the first side surface, and
wherein the protrusions comprise a first protrusion that protrudes from the first side surface of the first tooth to a first protrusion end, and a second protrusion that protrudes from the second side surface of the second tooth to a second protrusion end,
wherein the flow path is disposed between the first protrusion end and the second protrusion end.

* * * * *